May 12, 1959     T. J. MURPHY     2,885,993

SHAVE INDICATING DEVICE

Filed April 22, 1957

INVENTOR.

Thomas J. Murphy

BY R. W. Hodgson

United States Patent Office 2,885,993
Patented May 12, 1959

2,885,993

SHAVE INDICATING DEVICE

Thomas J. Murphy, Bel Air, Md., assignor of one-tenth to Gadget-Of-The-Month Club, Inc., Los Angeles, Calif., a corporation of California Application April 22, 1957, Serial No. 654,219

1 Claim. (Cl. 116—133)

Generally speaking, the present invention relates to the razor art and, more particularly, relates to a shave indicating device cooperable for insertion with respect to the end of a safety razor.

A problem which safety razor users have is the difficulty in remembering the number of shaves they have taken with one particular razor blade. This means that the user may discard a razor blade while it is still sharp and conversely may attempt to shave with a dull razor blade, possibly resulting in a cut face. This problem of trying to remember how many shaves have been taken with a particular blade in order to make the most economical use of that blade is more trying to those persons who alternate shaving with a safety razor and an electric razor.

The present invention was developed primarily to overcome the aforementioned problems and, generally speaking, can be said to be a shave indicating device cooperable for insertion with respect to the end of a safety razor and includes a first indicator member and a second indicator member. The second indicator member is rotatably mounted within the first indicator member for selective rotation about a longitudinal axis. The first indicator member has a hollow stem, normally threaded on the outside, cooperable for insertion into the end of a safety razor and the second indicator member has a stem which is cooperable for insertion into the aforementioned hollow stem of the first indicator member. One of the indicator members has an index thereon, usually the first member, and the other of said indicator members has a pointer, usually the second indicator member, although not so limited to that particular arrangement. One of the indicator members has a locking pin and the other indicator member has symmetrically spaced recesses wherein the locking pin is inserted to selectively lock both indicator members with respect to each other. Spring biasing means, mounted within said hollow stem of the first indicator member, is cooperable for yieldingly urging the second indicator member against the first indicator member.

From the above description of basic and generic forms of the present invention, it will be apparent to those skilled in the art that virtually all of the hereinbefore mentioned prior art problems and/or disadvantages are substantially entirely eliminated, met and/or overcome in and through use of the present shave indicating device.

The principal object of the present invention is to provide a shave indicating device which is cooperable for insertion into the end of a safety razor and which will easily indicate the number of times a particular razor blade has been used thereby insuring the most economical and advantageous use of the razor blade.

It is a further object of the present invention to provide a shave indicating device which is inexpensive, easy to operate and of virtually foolproof construction.

Other and allied objects will be apparent to those skilled in the art after a careful perusal, examination and study of the accompanying illustrations, the present specification, and the appended claims.

To facilitate understanding, reference will be made to the hereinbelow described figures, in which.

Figure 5:
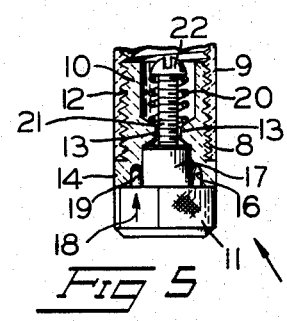
Fig. 5 is a fragmentary sectional view, with the safety razor broken away, of the present invention in a locked position.
Figure 6:
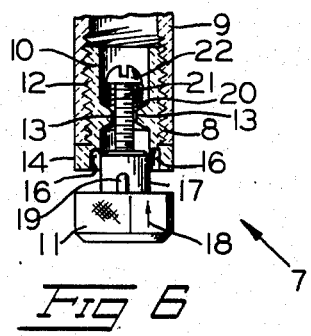
Fig. 6 is a fragmentary sectional view, with the safety razor broken away, of the present invention in an unlocked (or disengaged) position and cooperable for selective rotation about a longitudinal axis.

Generally speaking, the shave indicating device, indicated generally at 7 in Figs. 1, 2, 5, and 6, is cooperable for threaded insertion into the interiorly threaded end 8 of a safety razor 9, as best shown in Figs. 5 and 6.

The shave device 7 includes a first indicator member 10 and a second indicator member 11, with said second indicator member 11 being rotatably mounted within the indicator member 10 for selective rotation about a longitudinal axis.

The first indicator member 10 is provided with an exteriorly threaded hollow stem 12 including a hollow seat 13 therein, an enlarged head 14 having a circumferential index 15, and recesses 16 around the top of the enlarged head 14, as best shown in Figs. 2, 4–6.

The second indicator member 11 has an interiorly threaded hollow stem 17, is cooperable for insertion into the hollow stem 12 adjacent the enlarged head 14 of the member 10, a pointer 18 on the border thereof, and a locking pin 19 which is cooperable for selective locking insertion into the recesses 16 of the first indicator member 10, as shown in Figs. 2, 3, 5, and 6.

The indicator members 10 and 11 are urged together by means of a spring 20, mounted against the hollow seat 13 within the stem 12, and a screw 21 having a head 22, with the head 22 securing the spring 20 against the hollow seat 13 and the threaded end of the screw 21 extending through the hollow stem 12 into threaded engagement with the interiorly threaded stem 17 of the second indicator member 11, thereby urging the second indicator 11 against the first indicator member 10, as best shown in Figs. 5 and 6.

Figure 1:
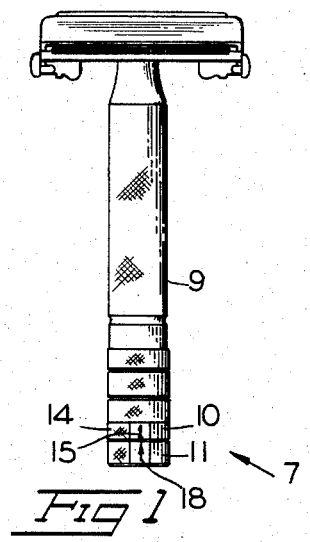
Fig. 1 is a front elevational view of the present invention installed on the end of a conventional safety razor.
Figure 2:
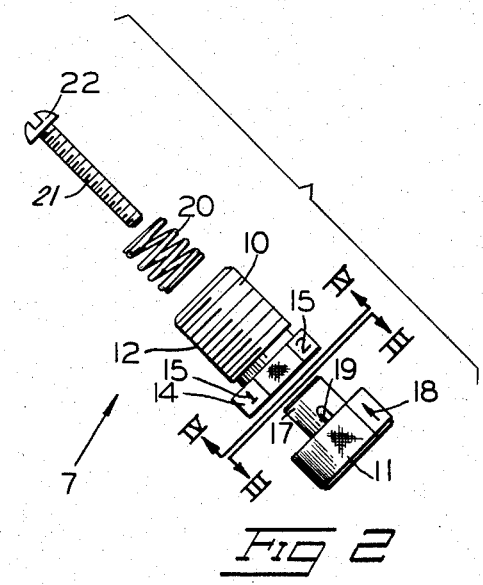
Fig. 2 is an exploded plan view of the present invention.
Figure 3:
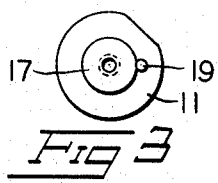
Fig. 3 is a view taken in the direction of the lines III—III in Fig. 2.
Figure 4:
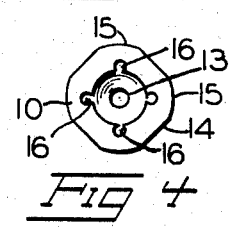
Fig. 4 is a view taken in the direction of the lines IV—IV in Fig. 2.

To rotate the device 7 to a new number the second indicator member 11 is disengaged from the locked position, as shown in Figs. 1 and 5, by extending the member 11 outward and distending the spring 20 until the locking pin 19 is completely out of the recess 16 of the first member 10 whereupon the second member 11 may be rotated clockwise to the succeeding number, as shown in Fig. 6, and then inserting the pin 19 into the next recess 16 to reciprocally lock the members 10 and 11 against each other.

It should be noted that the first indicator member may be press fitted with respect to the end of a safety razor and need not necessarily be in threaded engagement therewith.

Numerous modifications and variations of the present invention will occur to those skilled in the art after a careful study hereof. All such properly within the basic spirit, scope and/or teachings of the present invention are intended to be included and comprehended herein as fully as if specifically described, illustrated and claimed.

For example, it is obvious that the positions of the locking pin and the recesses may be completely reversed and that other locking means may be used other than as specifically described and claimed herein. Also the locking means may be eliminated entirely in some versions of the present invention. The relative positions of the numerical index and the pointer may also be reversed.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claim, with due consideration for the doctrine of equivalents.

I claim:

A shave indicating device cooperable for threaded insertion into the interiorly threaded end of a safety razor, comprising: a shave indicating device including a first indicator member and a second indicator member, said second indicator member rotatably mounted within said first indicator member for selective rotation about a longitudinal axis; said first indicator member having an exteriorly threaded hollow stem including a hollow seat therein, an enlarged head having a circumferential index, and recesses around the top of said enlarged head; said second indicator member having an interiorly threaded stem, cooperable for insertion into said hollow stem of said first indicator member, a pointer on the border thereof, and a locking pin cooperable for selective locking insertion into said recesses of said first indicator member; spring biasing means including a spring, mounted against said hollow seat, a screw having a head, with said head securing said spring against said hollow seat and the threaded end of said screw extending through said hollow stem of said first indicator member into threaded engagement with said interiorly threaded stem of said second indicator member, and cooperable for yieldingly urging said second indicator member against said first indicator member; said second indicator member being cooperable, upon disengagement from said first indicator member, for selective rotation about a longitudinal axis.

References Cited in the file of this patent

UNITED STATES PATENTS

| 1,966,193 | Weber | July 10, 1934 |

FOREIGN PATENTS

| 454,943 | Great Britain | Oct. 9, 1936 |
| 698,355 | Germany | Nov. 8, 1940 |